(12) United States Patent
Weinberg et al.

(10) Patent No.: US 8,793,195 B2
(45) Date of Patent: Jul. 29, 2014

(54) AUTOMATED MAILPIECE PROCESSING (75) Inventors: Henri B. Weinberg, Lexington, MA (US); Jonathan D. Styles, Newton, MA (US); Jefferey G. Prus, Wellesley, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 0 days.

(21) Appl. No.: 11/759,303

(22) Filed: Jun. 7, 2007

(65) Prior Publication Data

US 2008/0306884 A1 Dec. 11, 2008

(51) Int. Cl.
*G06Q 30/00* (2012.01)
*G06K 15/00* (2006.01)
*G06Q 10/08* (2012.01)
*G06K 15/02* (2006.01)

(52) U.S. Cl.
CPC ............ *G06Q 10/083* (2013.01); *G06K 15/021* (2013.01)
USPC .......................................... 705/330; 358/1.18

(58) Field of Classification Search
CPC .............................. G06Q 10/083; G06K 15/00
USPC ............................. 705/1, 410, 330; 358/1.18
See application file for complete search history.

(56) References Cited

U.S. PATENT DOCUMENTS

| | | | |
|---|---|---|---|
| 5,142,482 A | 8/1992 | Sansone | |
| 5,909,805 A * | 6/1999 | Neely | 206/308.1 |
| 5,947,461 A | 9/1999 | Holbrock | |
| 5,978,564 A * | 11/1999 | Girardi et al. | 358/1.18 |
| 6,055,520 A | 4/2000 | Heiden et al. | |
| 2002/0026359 A1* | 2/2002 | Long et al. | 705/14 |
| 2003/0168388 A1* | 9/2003 | Malatesta | 209/584 |
| 2004/0008370 A1* | 1/2004 | Keane et al. | 358/1.15 |
| 2004/0109147 A1 | 6/2004 | Redd et al. | |
| 2004/0267616 A1* | 12/2004 | Kargman | 705/14 |
| 2005/0015164 A1 | 1/2005 | Loring et al. | |
| 2006/0053085 A1* | 3/2006 | Guyett et al. | 705/410 |
| 2006/0165458 A1 | 7/2006 | Gortemaker et al. | |
| 2007/0046019 A1 | 3/2007 | Harrison et al. | |
| 2007/0233504 A1* | 10/2007 | Tait | 705/1 |

* cited by examiner

*Primary Examiner* — Allen J Jung
(74) *Attorney, Agent, or Firm* — Jessica Costa (57) ABSTRACT

System and method for the addressing of mail pieces by a variable printing system. Information allowing a mail piece to be associated with a mailing list of address information is printed on the mail piece prior to processing of the piece by a variable printing system. As the piece is processed by the variable printing system, the information printed on the piece is read and used to identify a mailing list from among a plurality of available mailing lists. Address information for that mail piece is obtained from the identified mailing list and printed on the mail piece by the variable printing system.

12 Claims, 5 Drawing Sheets

AUTOMATED MAILPIECE PROCESSING

FIELD OF THE INVENTION

This invention relates to the addressing and processing of mail pieces.

BACKGROUND OF THE INVENTION

Printing services web sites allowing a user to access the site from the user's home or work and design custom products for personal or commercial use are well known and widely used by many consumers, professionals, and businesses. For example, VistaPrint Limited markets a variety of printed products through the site VistaPrint.com, such as business cards, postcards, brochures, holiday cards, letterhead, announcements, invitations and the like. As an additional service to customers, some printing services sites also offer mailing services, including the individual addressing and mailing of printed pieces to a list of names and addresses provided by the customer. Printing services sites offering mailing services may also offer customers the opportunity to purchase or rent custom-generated mailing lists of prospective customers, typically based on customer-specified geographic or demographic targeting parameters such as zip codes, household income, or hobbies.

Modern print services sites offering mailing services typically receive the electronic file of the customer's product design, which may have either been uploaded as a finished design to the site or created directly on the site using online design tools provided by the site, and receive one or more electronic mailing lists of addresses to which the customer desires the printed products to be mailed.

The fulfillment of a customer's mailing services order typically involves the use of multiple printing systems. An offset or digital print press is initially used to print the text, images and other product content that is common to all of the mail pieces in the customer's order. After the common content has been printed, the printed pieces are then individually processed by a variable printing system that prints a different name and address read from the associated mailing list on each piece. Modern commercial variable printing systems tend to be highly automated and incorporate internal data storage capabilities for storing and retrieving individual addresses from an internally retained list for printing as an order's individual mail pieces are moving through the variable printing system.

Known variable printing systems, however, place certain limitations and restrictions on the human operator and require careful operator attention to ensure that the individual mail pieces in the orders are addressed properly. The operator must be careful to match each physical group of printed mail pieces with the corresponding electronic mailing list and must be sure that each group of pieces is introduced into the printer in the proper sequence and that the proper mailing list associated with the order is available in the variable printing system memory, ready for use, and selected by the printer operator before the printed products are introduced into the printer. While this process is generally adequate when the number of mail pieces in an order is large, the burden on the operator and the possibility of a problem is increased if the mailing service provider is dealing with a large number of orders for relatively small quantities of mail pieces. When many orders for small quantities are being processed, the checking, monitoring, and verifying activities by the operator tend to result in pauses in production so that the variable printing system is not being used to its maximum capacity. Any mismatch between the product and the mailing list can result in mis-addressing which could cause the delay and expense of the mailing service provider having to reprint an order again on the offset or digital press or in mail being sent to the wrong recipients.

There is, therefore, a need for systems and methods that increase the amount of time the printing system is actively operating and simplify the task of the system operator.

SUMMARY

The present invention is directed at satisfying the need for automated systems and methods for individually addressing mail pieces.

In accordance with one embodiment of the invention, identifying information is printed on each individual mail piece prior to processing of the mail piece by a variable printing system. As the mail piece is processed by the variable printing system, the identifying information on the piece is read and used to identify a mailing list associated with that mail piece. Address information is dynamically obtained from the identified mailing list and printed on the piece.

In accordance with another embodiment of the invention, routing information indicating the output gate of the variable printing system to which that mail piece should be directed is provided with the address information to be printed.

It is an object of the invention to simplify and improve the efficiency of the operation of processing multiple different mail piece orders.

It is an advantage of the invention that the system operator is not required to match the physical products being introduced into the printing system with a mailing list.

It is a further advantage that careful sequencing of different orders is not required such that unrelated orders can be introduced into the system without pause or separation, thereby increasing the time the printing system is in a productive state of operation.

It is an advantage of one embodiment of the invention that individual mail pieces can be routed to printing system output locations based on the mail piece's postage level, mail carrier, or other parameter.

It is another advantage of one embodiment of the invention that any mail pieces in excess of the number of available addresses in the mailing list can be routed to an output location for unneeded mail pieces.

These and other objects, features and advantages of the invention will be better understood with reference to the accompanying drawings, description and claims.

DETAILED DESCRIPTION

Figure 1:
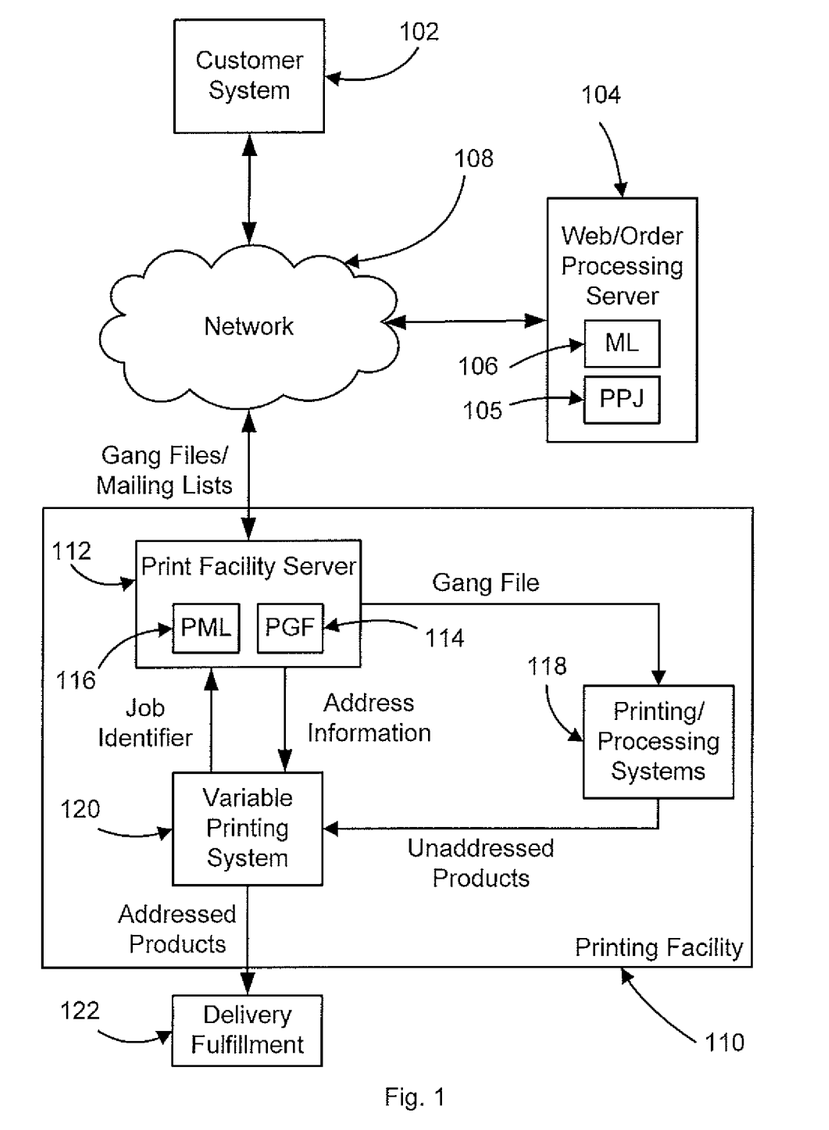
FIG. 1 depicts an embodiment of one system with which the invention may be employed.

FIG. 1 depicts one illustrative environment in which the invention may be employed. Customer system 102 communicates and interacts with web/order processing server 104 over communication network 108, such as the World Wide Web. Customer system 102 could be a typically equipped personal computer capable of network communication with server 104 or, alternatively, could be any other suitable device such as a portable computer, a tablet computer, or a computer system adapted or provided for electronic product ordering, such as a kiosk, workstation, or terminal.

Server 104, operated by a printing and mailing services provider, receives from customer system 102 the electronic description of a product that a customer desires to have printed in a desired quantity and one or more mailing lists containing addresses with which the customer would like his printed material to be individually addressed for mailing. While server 104 is shown in FIG. 1 as a single block, it will be understood that server 104 could be multiple servers and associated data storage components and subsystems configured to communicate and operate cooperatively to support the Web site and order processing operations. Server 104 may be simultaneously interacting with many user computer systems such as customer system 102.

Server 104 maintains a database, indicated in FIG. 1 as pending print jobs (PPJ) 105, containing the electronic descriptions of individual product jobs that are awaiting printing. Associated with each pending print job are indications of the product type, the paper stock to be used, the quantity ordered, the customer's account information, delivery date, and the like. As new orders are received from customers, the new product descriptions and associated information are added to PPJ 10. While shown in FIG. 1 as a single block, PPJ 105 could be embodied as multiple different memory systems each storing different components of the product design.

Server 104 also maintains the mailing lists uploaded by customers for use in addressing the ordered product designs in PPJ 105, collectively indicated as ML 106. The organization and formatting of mailing lists is well known in the art. In the described embodiment, mailing lists are accepted from customers in .CSV (comma delimited), .XLS (Microsoft Excel), and .TXT (tab delimited text) formats. It will be understood that other formats could be accepted and supported, if desired. For mailing services customers who do not have a mailing list of their own to upload or who wish to acquire and use an additional mailing list to attempt to expand their customer base, ML 106 may also be implemented by the site operator to offer a plurality of additional mailing lists that the printing service provider generates specific to each customer's targeted marketing criteria and makes available for lease or purchase by customers.

As a further service to its customers, the site may offer various list management services, such as merging multiple mailing lists, detecting and removing duplicate mailing list entries, and checking addresses in the mailing list for "bad" addresses, such as addresses missing essential addressing information or for which the zip code and the street address do not match. For the address entries flagged as bad, the user may be offered the opportunity to either review and correct those addresses individually or simply remove all bad addresses from the list.

As used herein in describing the embodiment below, the term "order" refers to an order placed by a customer to print a quantity of a given mail piece, individually address each piece with address information from one or more mailing lists, and insert the addressed pieces into the postal system for delivery according to user-selected postage parameters. For example, a request to produce, address, and mail a quantity of 250 postcards as first class postage would be an order. The term "print job" refers to the electronic design of the customer's product that is to be printed in a desired quantity on paper sheets or other print stock to create a quantity of individual printed products, referred to herein as mail pieces, for addressing and mailing. In the description herein, the illustrative example of a postcard mail piece is employed, but it will be understood that the invention is not so limited and can be used for the processing of any type of product which is to be mailed. The product design the customer desires to be printed may have been prepared by the customer using self-service online product design and ordering programs and tools provided by the printing services provider, such as the product design and ordering tools provided by VistaPrint Limited and publicly available at VistaPrint.com, or may have been created or obtained by the customer from another source.

Figure 2:
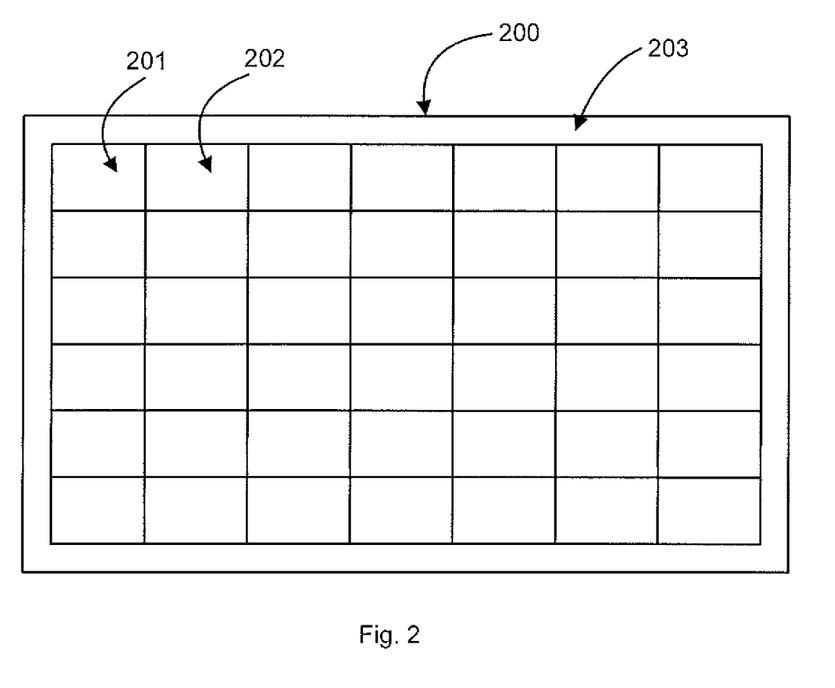
FIG. 2 is an illustrative example of an aggregate print job gang.

A large Web-based printing services provider may routinely print thousands of different individual print jobs each day. For this type of volume printing operation, at any given moment database PPJ 105 may contain a very large number of pending print jobs awaiting production. For a printing services provider engaged in printing large numbers of relatively short run individual orders for personalized products, the provider may find it advantageous to assemble many of the individual print jobs into a larger aggregate print job or "gang" having similar print requirements, e.g., paper stock, quantity to be produced, and required post-printing processing. The ganging of many individual print jobs into a single aggregate print job file allows many individual products to be printed simultaneously on relatively large sheets of paper or other material. After printing, the printed sheets are cut to separate the various individual printed products for subsequent packaging and shipment to the individual customers. U.S. Pat. No. 7,145,670 entitled "Method of Aggregating Multiple Individual Print Jobs Having Common Printing Parameters", the entire disclosure of which is hereby incorporated by reference, discloses a system for the creation and printing of aggregate print job files comprising multiple individual print jobs The assembling of many individual print jobs into an aggregate print job for the purpose of simultaneous printing allows the material and production costs associated with using large printing systems to be shared among all the jobs in the gang, making the share of the production cost for each individual job relatively small. FIG. 2 illustrates gang 200 for the simultaneous printing of 42 postcard print jobs on a sheet having dimensions of 1.0 meter by 0.6 meter. Position 201 could be the postcard design for customer A, position 202 the postcard design for customer B, and so forth. With this gang, 42 separate print jobs for 42 different customers can be simultaneously created by assembling the electronic business card files into a single large electronic gang file, printing a desired quantity of copies of the gang file, and cutting the stack of printed gang sheets to separate the printed stack into separate sets of postcard orders for individual addressing according to 42 different mailing lists. Gang identifiers, registration marks, date of production, and other information used by the printing services provider for internal processing and gang tracking can be printed in the available margin area 203.

Referring again to FIG. 1, when a gang has been assembled for printing, the production gang files and the associated mailing list information are transmitted from server 104 to printing facility 110 for printing and addressing. While FIG. 1 depicts an embodiment wherein server 104 and printing facility 110 are geographically remote from each other and communicate via network 108, it will be understood that other physical configurations and communications techniques could be employed. For example, server 112 or server 104 could be co-located at printing facility 110 such that communications between the server 104 and printing/processing systems 118 could occur over a local area network or intranet or by other electronic or manual techniques. As another alternate embodiment, a single server system located at printing facility 112 could be implemented to perform the functions of both server 104 and server 112. In addition, while a single printing facility 110 is depicted in FIG. 1, it will be understood that a service provider having a geographically dispersed group of customers could advantageously employ multiple printing facilities in different geographical locations.

At facility 110, the gang files received from server 104 for printing are stored in one or more computer readable media indicated collectively as production gang files PGF 114. The mailing lists and related information associated with the received gang files are stored in one or more computer readable media indicated collectively as production mailing lists PML 116. Routing information to be supplied to the variable printing system to specify which one of the output gates of the variable printer should receive the mail piece is also associated with the addressing information in the mailing lists in PML 116. While server 112 is shown as a single block, it will be understood that server 112 could be multiple servers and associated data storage components and subsystems.

When the printing of a gang is to be initiated, the gang file is transferred from server 112 to printing/processing systems 118. Printing/processing systems 118 represents the printing presses and all associated equipment and systems to produce the desired quantity of printed pieces for subsequent processing by variable printing system 120. Printing/processing systems 118 may include both offset and digital printing systems. An offset press has a relatively greater setup cost than a digital press, but has a lower per copy cost for print jobs printed at higher quantities. The operator of printing facility 110 may, therefore, either manually or automatically assign print jobs to an offset or digital production press primarily on the basis of the quantity to be produced. Products ordered in lower quantities, for example fewer than 100, might be produced on a digital press while products ordered at larger quantities, such as 100 or more, might be produced on an offset press.

If the printer is using offset printing to print the products, printing/processing systems 118 would include a raster image processor (RIP), which converts the received gang file from the format used to transmit the file, such as PDF, into four CMYK color-separated electronic files, and a plate maker, which receives the CMYK files from the RIP and creates the corresponding metal plates for use by an offset printing press capable of printing large paper stock, for example a 41-inch Roland 700 press from Man Roland. If the printer is using a digital printing system, for example an Indigo digital press from Hewlett-Packard, the electronic gang file can be supplied directly to the press. The digital press will perform the required RIP processing and print the gang file on the desired quantity of sheets of paper stock.

After the gangs have been printed, a cutter cuts the stack of printed sheets along the perimeters of the individual print jobs to separate the different products into individual stacks to prepare the printed products for individual addressing of individual pieces. For some products, additional equipment could also be employed to perform post-printing processing steps, such as folding, gluing, or additional trimming.

After printing and processing by systems 118, the stacks of unaddressed mail pieces are then processed by variable printing system 120. As will be discussed in more detail below, as each piece moves through variable printing system 120, system 120 will read the job identifier printed on the piece and transmit the identifier to print facility server 112. Server 112 will retrieve an address, if one is available, from an associated mailing list in production mailing lists PML 116 and return the address to variable printing system 120 to be printed on the piece. After addressing, each finished mail piece is routed to an appropriate gate based, for example, on the postal carrier to be used or the postage level for the piece, and then placed in a tray or other suitable carrier for transfer to delivery fulfillment 122, which could be the postal service or could be a contractor providing additional sorting, distribution, or other services prior to eventual transfer to the postal service for delivery.

Figure 3:
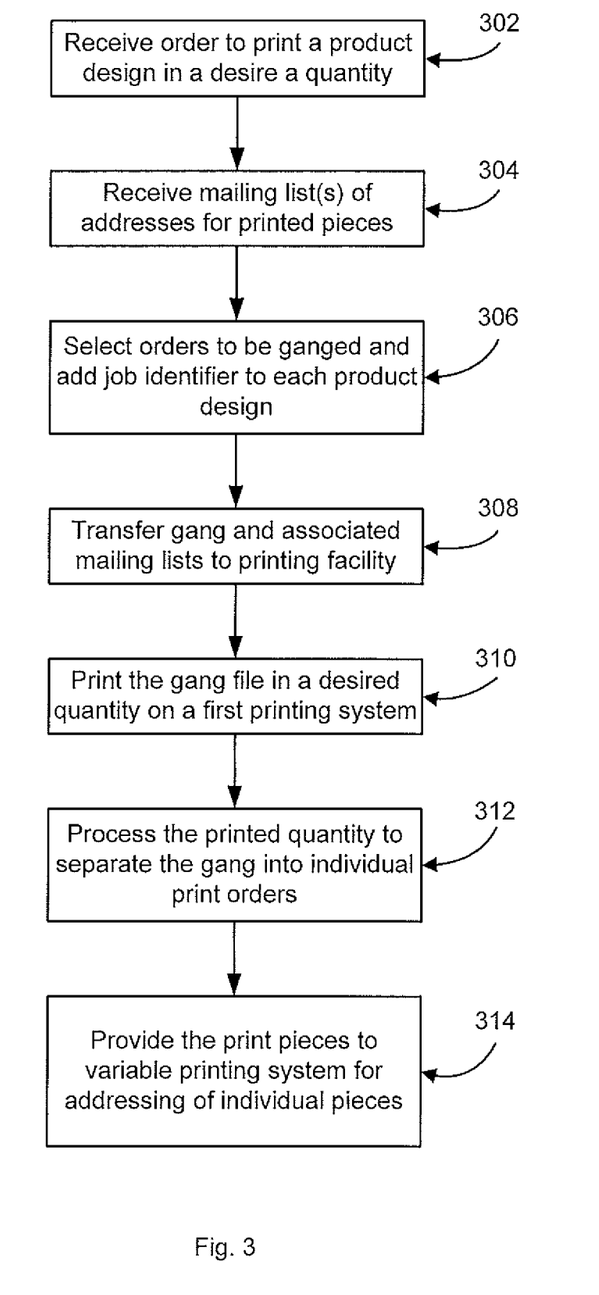
FIG. 3 is a flow diagram of a method for preparing printed products for use by a variable printing system.

Referring now to FIG. 3, one embodiment of a method for producing a quantity of mail pieces for processing by a variable printing system will be discussed. At step 302, an order for the printing and mailing of a quantity of mail pieces is received at web/order processing server 104 from a customer system 102 and assigned an order identifier. The electronic design of the product to be printed may be uploaded to server 104 as a part of the order placement process or may be uploaded separately. At step 304, the operator of customer system 102 uploads the list or lists of names and addresses to which the operator desires that the mail pieces be mailed. Instead of, or in addition to, using a mailing list uploaded by system 102, server 104 may also make additional lists available for use in connection with the mail pieces. The mailing list or lists to be used for addressing the customer's products are associated with the order identifier.

At step 306, a number of pending print jobs to be assembled into a gang for printing are selected from the available pending print jobs in production print jobs PPJ 105. The printing of the individual print jobs as gangs is not essential, but, as mentioned above, may be advantageous, particularly for smaller print quantities. Each gang is assigned a gang identifier. Each individual product being produced at printing facility 110 can, therefore, be uniquely identified by the combination of its gang identifier and the identifier of the position that the product design occupied within the gang. The combination of the gang and position identifiers for the product, expressed as a bar code, is incorporated by server 104 into the electronic design of the product such that a corresponding bar code will be printed on each individual piece by systems 118. As will be described in more detail below, the bar code on each mail piece will later be read by the variable printing system and used to retrieve the addressing information to be printed on that piece and the associated routing information that will help direct the variable printing system in the processing and sorting of the piece.

At step 308, the gang file and associated mailing list information for the individual orders in the gang are forwarded electronically from server 104 to printing facility 110 for retention in pending gang files 114 and pending mailing lists 116, respectively. The transferred mailing list information includes the mailing lists containing the address information and also the additional information necessary to identify the mailing list that is associated with each individual print job identifier, including information for correlating each gang and gang position identifier with the corresponding customer order identifier for that product and information for correlating the order identifier with the associated mailing list. The gang files and the mailing list information need not be transferred simultaneously.

At step 310, the gang file is printed in a desired quantity and cut by printing/processing systems 118 to separate the printed gang sheets into individual stacks of mail pieces. At step 314, the stacks of unaddressed mail pieces are fed into variable printing system 120 for individual addressing. The different individual print jobs from the gang do not need to be arranged in any particular sequence prior to introduction into system 120. Because each mail piece bears an indicator that enables it to be associated with a mailing list and processing information in PML 116, individual mail pieces can be fed into system 120 in any order. There is no requirement to keep all mail pieces of an order together during processing or to process orders or mail pieces in any particular sequence.

Figure 4:
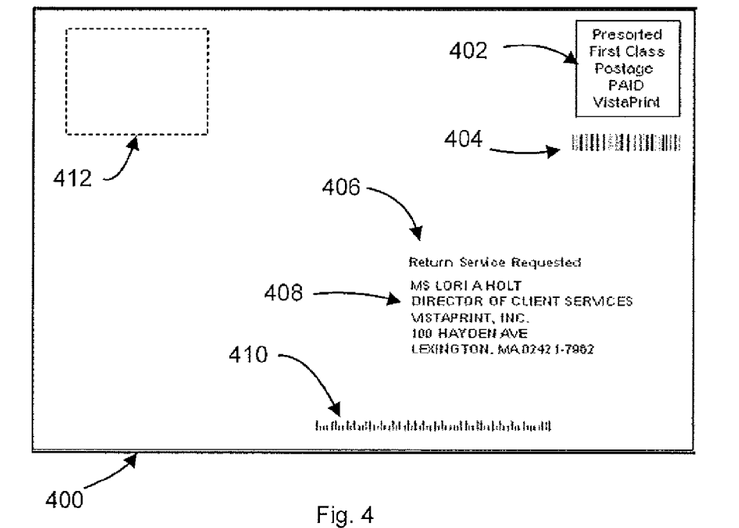
FIG. 4 illustrates a sample mail piece.

FIG. 4 is a representation of a sample mail piece, in this example a postcard 400, after it has been processing by variable printing system 120. Postage notice 402 indicates the type of postal service for the piece. Order identifier 404 is implemented in the depicted example as a bar code encoded with information identifying the specific order with which that piece is associated. While a bar code printed on the mail piece is one technique for enabling a mail piece to be identified, it will be appreciated that any other technique or process for labeling, marking, or otherwise identifying the piece in a way that enables the piece to be scanned, read, or otherwise perceived by appropriate equipment associated with the variable printing system could be employed. In the disclosed embodiment, the bar code identifies the gang and position within the gang of that product design. Other information capable of identifying the mail piece, such as the identifier that was assigned to the order at the time the order was placed by the customer, could be employed, if desired.

The content of service endorsement field 406 is user-selectable from among the choices "Return Service Requested", "Address Service Requested", and "Or Current Resident". Address field 408 contains the name and address information retrieved from the customer's mailing list. In this postcard embodiment, up to eight lines of address information can be accepted and printed. Bar code 410 is the standard United States Postal Service bar code symbology that encodes the "ZIP+4" code of the address. Field 412 represents the customer's optional return address information, if it was provided.

The fields printed on postcard 400 that are common across all of the individual pieces in the product order can be incorporated into the product design by the printing service provider prior to printing of the product on the offset or digital printing press at systems 118. In the example postcard shown in FIG. 4, job identifier 404 will always be the same for all mail pieces in an order and it will be printed on each mail piece before the mail pieces are processed by the variable printing system. If all mail pieces in the order will have the same postage level, postage notice 402 can also be incorporated into the product design and printed on the offset or digital press. If different postage notices are required within an order, for example if the mailing list associated with the order contains mailing addresses in multiple countries, the printing of postage notice 402 can be done by variable printing system 120 based on postage notice information identified to system 120 when the address is provided from PML 116. Similarly, service endorsement field 406 could be printed on the offset or digital press, if the same endorsement is to be used on all of the pieces, or could be printed on the variable printer if different endorsements will be used within the same order. Address field 408 and the encoded zip code field 410 will vary for each mail piece and, therefore, will be printed by variable printing system 120.

Figure 5:
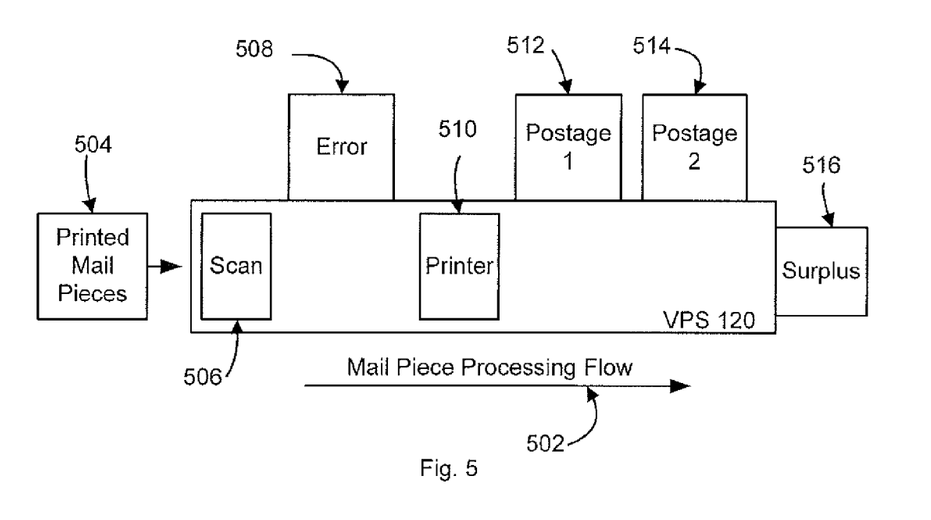
FIG. 5 is a simplified representation of one embodiment of a variable printing system with which the invention may be employed.
Figure 6:
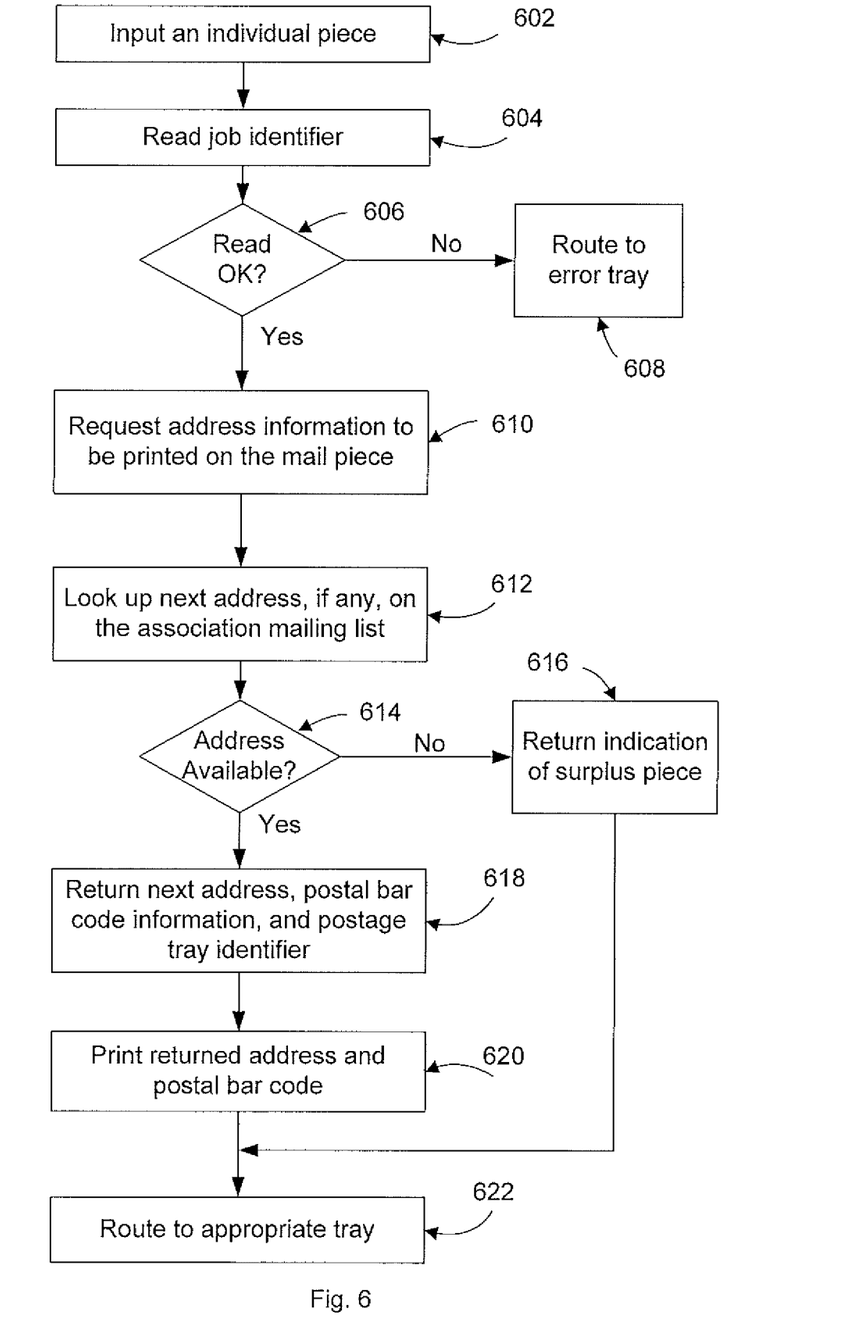
FIG. 6 is a flow diagram of a method for addressing and processing individual mail pieces.

Referring to FIGS. 5 and 6, the processing of mail pieces by variable printing system (VPS) 120 will be discussed. In the disclosed embodiment, VPS 120 employs a Buhrs Model PPS30K available from Buhrs-Fulfillments Systems BV. Other commercially available variable printing systems could also be employed. The general direction of movement of the mail pieces through the system in FIG. 5 is from left to right as indicated by arrow 502. At step 602, VPS 120 takes an unaddressed printed mail piece from the supply of unaddressed mail pieces 504 and moves it past bar code scan module 506. At step 604, scan module 506 reads the bar code 404. At step 606, if scan module 506 is unable to successfully read the bar code from the mail piece, the piece is diverted at step 608 to error gate 508 for manual review. The failure to successfully read indicator 404 from a mail piece may not have been caused by any defect in the mail piece itself. Since job identifier 404 allows each mail piece to be independently identified and processed in any sequence, any mail pieces that were diverted to error gate 508 because they were not successfully read can, if desired, simply be reintroduced again as printed mail pieces 504 to see if a successful read can be achieved with another try.

If bar code 404 is successfully read at step 606, the bar code information identifying the gang and gang position of the mail piece is transmitted from VPS 120 to print facility server 112 at step 610 to cause server 112 to initiate the lookup of the address information to be printed on the mail piece at server 112. As mentioned above, the bar code information printed on the mail piece identifies the gang in which that mail piece was printed and the specific position within that gang at which the mail piece was located. Server 112 uses the gang and gang position information from the mail piece to identify the associated customer order identifier, which is then used in turn to identify a specific associated mailing list in PML 116. The next unused block of address information is then retrieved from the identified mailing list. That block of address information is then identified as having been used. The zip code information from the retrieved address is used by server 112 to assemble the nine digits for the ZIP+4 postal bar code 410. At step 618, the next address information, the postal bar code information, and an indication of the output tray to which the piece should be directed are returned to VPS 120. Step 618 may also include returning postage notice 402 information or service endorsement 406 information, if printing of the postage notice or the service endorsement at VPS 120 is desired. At step 620, printer module 510 will print the returned address information in field 408, postal service bar code 410 and, if required, service endorsement 406 to be printed by VPS 120.

To create a streamlined and standardized online automated ordering process and to facilitate efficient ganging operations, the printing services provider may only offer to print mail pieces in a limited number of standard quantities. For example, an online customer may be asked to choose from standard print quantities such as 100, 250, 500, 1000, and so forth. Because the number of addresses in the typical customer's mailing list will typically not match these quantities exactly, the customer will generally "round up" and order the next highest print quantity that meets the customer's mailing list size requirement. In many situations, therefore, the number of mail pieces printed for a customer on the offset or digital press will exceed the number of addresses in the customer's mailing list. At step 614, if all addresses from the customer's mailing list have been used and no more address information is available, an indication is returned to VPS 120 at step 616 to treat the mail piece as surplus. In this situation, no information is printed on the piece by print module 510 and the piece would be routed to surplus bin 516.

At step 622, after the piece has been printed as necessary by print module 510, VPS 120 will direct the piece to the appropriate gate for further processing. The manufacturers of commercial variable printing systems typically design the systems to be modular such that additional routing mechanisms and gate options can be added as desired. In the embodiment depicted in FIG. 5, a mail piece may take one of three paths after passing printer module 510. VPS 120 is configured with two postage gates, indicated as postage 1 and postage 2, allowing VPS 120 to simultaneously process and sort mail pieces having two different postage levels. More or fewer gates could be employed, if desired. The surplus pieces that were printed and provided as input mail pieces 504 to VPS 120, but were unneeded because all address information from the customer's mailing list had already been used, are directed to surplus bin 516 for recycling or other disposal.

Modern commercial variable printing systems, such as the Buhrs system used in the described embodiment, incorporate many sensors and systems for monitoring the progress of mail pieces through the system and for detecting errors, such as the occasional mail piece jam, stuck roller, or inadvertent simultaneous feeding of multiple mail pieces. Because at any given moment variable printing system 120 will have multiple different mail pieces in various stages of processing, it is possible that address information that has been provided from PML 116 for a mail piece, and therefore has been flagged in PML 116 as having been used, may have been intended for use at system 120 with a mail piece that was damaged by a system 120 error or was discarded by system 120 while the system is being cleared and reset. To avoid some of the addresses in the customer's mailing list being missed, the recently transmitted addresses for pieces that were not successfully processed will have their status in PML 116 changed back to unused to make them again available for use when system 120 is restarted.

While an exemplary embodiment of the invention and various alternative embodiments have been discussed, the described embodiments are to be considered as illustrative rather than restrictive. For example, instead of retaining the mailing lists and related information needed to associate a mail piece identifier with a mailing list at print facility server 112, the mailing lists and associated information and code could be downloaded to and stored while needed in a suitably sized and configured computer readable medium within or directly accessible by the variable printing system itself. The scope of the invention is as indicated in the following claims and all equivalent methods and systems.

What is claimed is:

1. An automated method for addressing a mail piece, the method comprising:
   receiving an order for the printing of an individual print job comprising customer-specified content to be printed on a plurality of mail pieces;
   receiving selection of a mailing list containing at least a plurality of addresses with which the customer desires the plurality of mail pieces be addressed;
   associating the received mailing list with the order;
   selecting the individual print job to be combined along with a plurality of other individual print jobs from orders placed by different customers into an aggregate print job, the aggregate print job arranged with the customer-specified content from each of the selected individual print jobs in each of a plurality of predetermined positions in an aggregate print job layout;
   by one or more processors, incorporating into each individual print job selected for aggregation into the aggregate print job an identifier identifying the aggregate print job and the position of the respective individual print job in the aggregate print job layout;
   printing a plurality of copies of the aggregate print job to simultaneously print the aggregated individual print jobs and separating the plurality of copies into individual mail pieces corresponding to different customer orders;
   reading an identifier from a mail piece of the plurality of mail pieces;
   using the identifier to identify, by one or more processors, the mailing list associated with the order;
   selecting a mailing address from the identified mailing list; and
   printing the selected mailing address on the mail piece.

2. The method of claim 1 further comprising routing, by one or more processors, the addressed mail piece to a location for mail pieces that have been addressed.

3. The method of claim 1 further comprising routing, by one or more processors, the addressed mail piece to a first location if the addressed mail piece has a first postage level and to a second location if the addressed mail piece has a second postage level.

4. The method of claim 1 further comprising routing, by one or more processors, the addressed mail piece to a first location if the addressed mail piece is to be delivered by a first carrier and to a second location if the addressed mail piece is to be delivered by a second carrier.

5. The method of claim 1 further comprising identifying, by one or more processors, a postage notice associated with the mailing address and printing the identified postage notice on the mail piece.

6. The method of claim 1 further comprising identifying, by one or more processors, a service endorsement associated with the mailing address and printing the identified service endorsement on the mail piece.

7. The method of claim 1 further comprising, if no unused mailing address is available from the identified mailing list, routing, by one or more processors, the mail piece to a location for surplus mail pieces.

8. The method of claim 1 wherein the identifier is encoded as a bar code printed on the mail piece.

9. The method of claim 1 wherein the mail piece was printed with content prior to addressing and wherein the identifier was incorporated into the content prior to the content printed on the mail piece.

10. The method of claim 1, wherein the separated individual mail pieces may be addressed in any sequence.

11. A non-transitory computer-readable medium comprising program instructions which, when executed by a computer, implement a method for addressing a mail piece, the method comprising:
   receiving an order for the printing of an individual print job comprising customer-specified content to be printed on a plurality of mail pieces;
   receiving selection of a mailing list containing at least a plurality of addresses with which the customer desires the plurality of mail pieces be addressed,
   associating the received mailing list with the order,
   selecting the individual print job to be combined along with a plurality of other individual print jobs from orders placed by different customers into an aggregate print job, the aggregate print job arranged with the customer-specified content from each of the selected individual print jobs in each of a plurality of predetermined positions in an aggregate print job layout,
   incorporating into each individual print job selected for aggregation into the aggregate print job an identifier identifying the aggregate print job and the position of the respective individual print job in the aggregate print job layout, printing a plurality of copies of the aggregate print job to simultaneously print the aggregated individual print jobs and separating the plurality of copies into individual mail pieces corresponding to different customer orders, reading an identifier from a mail piece of the plurality of mail pieces, using the identifier to identify the mailing list associated with the order, selecting a mailing address from the identified mailing list, and printing the selected mailing address on the mail piece.

12. An apparatus for addressing a mail piece, the apparatus comprising:

one or more server systems comprising one or more processors, the one or more server systems configured to:

receive an order for the printing of an individual print job comprising customer-specified content to be printed on a plurality of mail pieces;

receive a selection of a mailing list containing at least a plurality of addresses with which the customer desires the plurality of mail pieces be addressed;

associate the received mailing list with the order;

select the individual print job to be combined along with a plurality of other individual print jobs from orders placed by different customers into an aggregate print job, the aggregate print job arranged with the customer-specified content from each of the selected individual print jobs in each of a plurality of predetermined positions in an aggregate print job layout; and incorporate into each individual print job selected for aggregation into the aggregate print job an identifier identifying the aggregate print job and the position of the respective individual print job in the aggregate print gob layout; and a printing system configured to receive the aggregate print job, print a plurality of copies of the aggregate print job to simultaneously print the aggregated individual print jobs, and separate the plurality of copies into individual mail pieces corresponding to different customer orders, a computerized addressing system configured to read an identifier from a mail piece of the plurality of mail pieces, identify the mailing list associated with the order using the identifier, select a mailing address from the identified mailing list, and print the selected mailing address on the mail piece.

* * * * *